Thomas William Talbot
INVENTOR.

Jan. 22, 1957     T. W. TALBOT     2,778,332
MEANS FOR LOCATING CRASHED AIRPLANES
Filed March 15, 1954     4 Sheets-Sheet 2

Thomas William Talbot
INVENTOR.

Jan. 22, 1957 T. W. TALBOT 2,778,332
MEANS FOR LOCATING CRASHED AIRPLANES
Filed March 15, 1954 4 Sheets-Sheet 4

Thomas William Talbot
INVENTOR.

United States Patent Office 2,778,332
Patented Jan. 22, 1957

2,778,332

MEANS FOR LOCATING CRASHED AIRPLANES

Thomas William Talbot, Santa Monica, Calif., assignor of one-half to Reed Tollefsen, Pacific Palisades, Calif.

Application March 15, 1954, Serial No. 416,161

2 Claims. (Cl. 116—124)

This invention relates to a signalling apparatus and more particularly to a device for providing means for locating crashed airplanes or the like.

The primary object of this invention resides in the provision of an automatically operated mechanism for enabling the prompt location of airplanes that have crash landed.

Incorporated in the present invention is a housing which is adapted to be attached to the aircraft in any suitable location. Within the housing is a balloon and means for inflating the balloon which are automatically ejected upon subjection of the aircraft and hence the elements of the invention to a suitable positive or negative deceleration. A reel and cable are provided so that the balloon once inflated with gas can be maintained at an elevation of approximately one thousand feet. The balloon may be suitable colored for day visibility and have a phosphorescent band or coating for increased night visibility. Further, the balloon may be coated with aluminum or other suitable metal so that it may provide a suitable reflecting surface for radar.

Incorporated in the present invention is a novel mechanism for actuating a firing pin to explode a cartridge which will eject the gas container and the balloon. Means are also provided for detaching the balloon from its reel after inflation, thereby enabling the balloon to rise upwardly.

Still further objects and features of this invention reside in the provision of an apparatus for enabling crashed airplanes to be readily located, which is strong and durable, simple in construction and manufacture, capable of being installed on various types and models of existing aircraft, which is highly efficiently in operation, and which has incorporated therein a switch for activating solenoids for breaking the circuit between the master switch and batteries of the aircraft, thus providing means for preventing fires.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
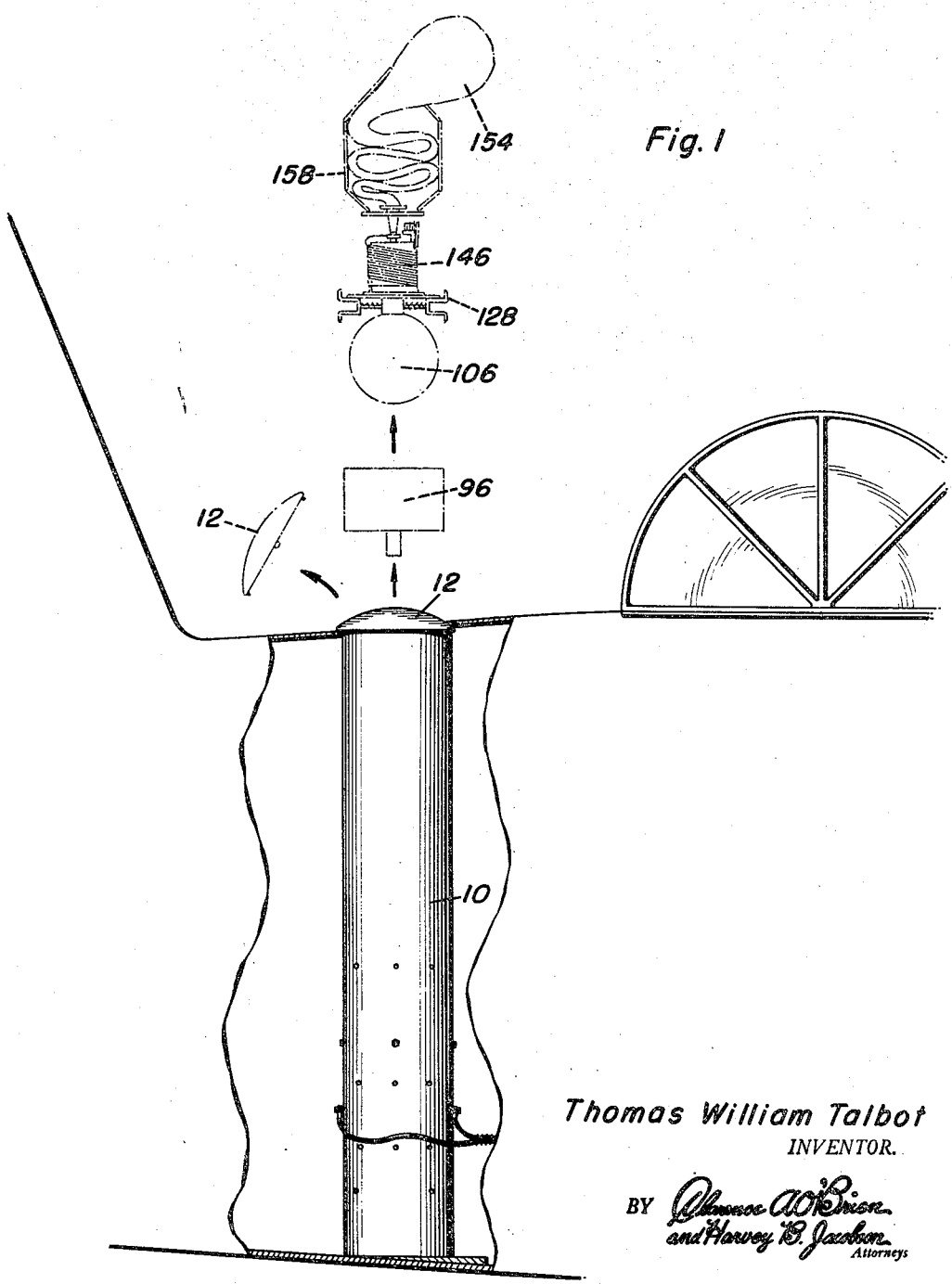
Figure 1 is a side elevational view of the apparatus comprising the present invention illustrating the manner in which the balloon and the apparatus for inflating the balloon are expelled therefrom.

With continuing reference to the accompanying drawings, the reference numeral 10 generally designates a preferably tubular housing in which the elements of the present invention are installed, the housing 10 being provided with a cover 12 which is resiliently held by means of clips 14 on the housing 10.

Secured in the housing 10 is a low mounting plate 16 attached by means of fasteners 18 and which is provided with a threaded collar 20 over which a socket member 22 is threadedly engaged so that a ball and socket type of universal joint can be effected between the spherical member 24 and a lower mounting plate 16. A threaded rod 26 is secured to the spherical member 24 and has a weight 28 adjustably threadedly secured thereto, the spherical member 24, the rod 26, and the weight 28 thus forming a pendulum.

The rod 26 has an annulus 30 attached thereto to which three springs 32 are affixed. The springs 32 also are attached to eye members 34 secured to the inner cylindrical walls of the housing 10. The springs 32 tend to maintain the pendulum in its initial position.

Threadedly secured to the spherical member 24 and further forming a part of the pendulum is a detent holder 36 which is provided with an aperture 38 therethrough, the lower portions of which are threaded for reception of an adjusting screw 40 for adjusting the initial compression on a spring 42 mounted within the detent holder 36 and resiliently engaging and extending between the adjusting screw 30 and a ball detent 44 carried by the detent holder.

The ball detent 44 is adapted to sit within a suitable recess 46 in a firing hammer holder 48 which is provided with an upper recess 50 therein for the reception of a coil spring 52 which is under an initial compression and which resiliently engages a firing hammer 54. The firing hammer holder 48 is externally threaded for reception of a sleeve 56 which is also externally threaded for adjustably mounting an electrically conductive collar 58 which, upon actuation, is adapted to complete an operative electrical circuit between the contacts 60 and 62 extending inwardly of the housing and attached by means of terminal posts 64 and 66 separately insulated as at 68 and 70 so that an operative electrical circuit to suitable solenoids or the like can be provided for breaking the electrical supply circuit between the batteries and the master switch of the airplane, thus decreasing the danger from fire.

A plate 72 is attached to the housing 10 by means of screws, as at 74, and has an upper substantially truncated conical portion 76 affixed thereto as by fasteners 78. The plate 72 and its conical portion 76 are apertured for reception of the firing hammer holder 48 and the conical portion 76 is further provided with a transverse aperture 80 therethrough. The firing hammer holder 48 is provided with an aperture 82 adapted to align with the aperture 80 and the firing hammer 54 has a recess 84 therein in alignment with the apertures 80 and 82.

A headed pin 86 extends through the apertures 80 and 82 and into the recess 84 to lockingly hold the firing pin holder 48 to the plate 72 and its conical projection 76 and the firing hammer 54 to the firing hammer holder 48.

Figure 9:
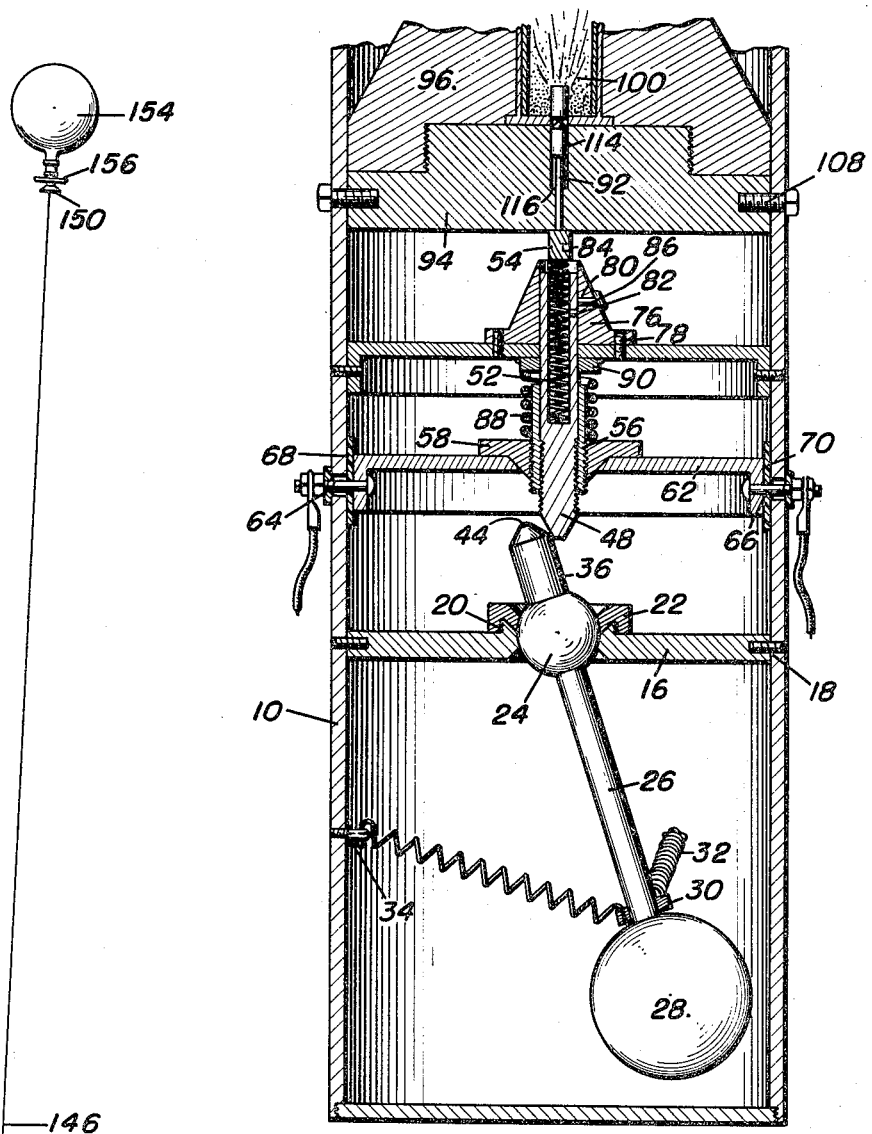
Figure 9 is a vertical sectional detail view similar to that of Figure 3 but illustrating the device in an actuated state.
Figure 2:
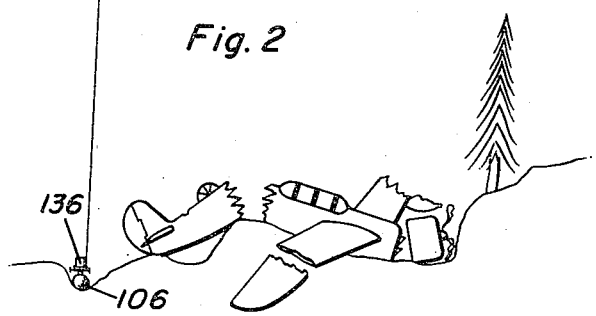
Figure 2 is an elevational view illustrating the manner in which the balloon provides an indication of the location of a crashed aircraft.
Figures 3, 3A:
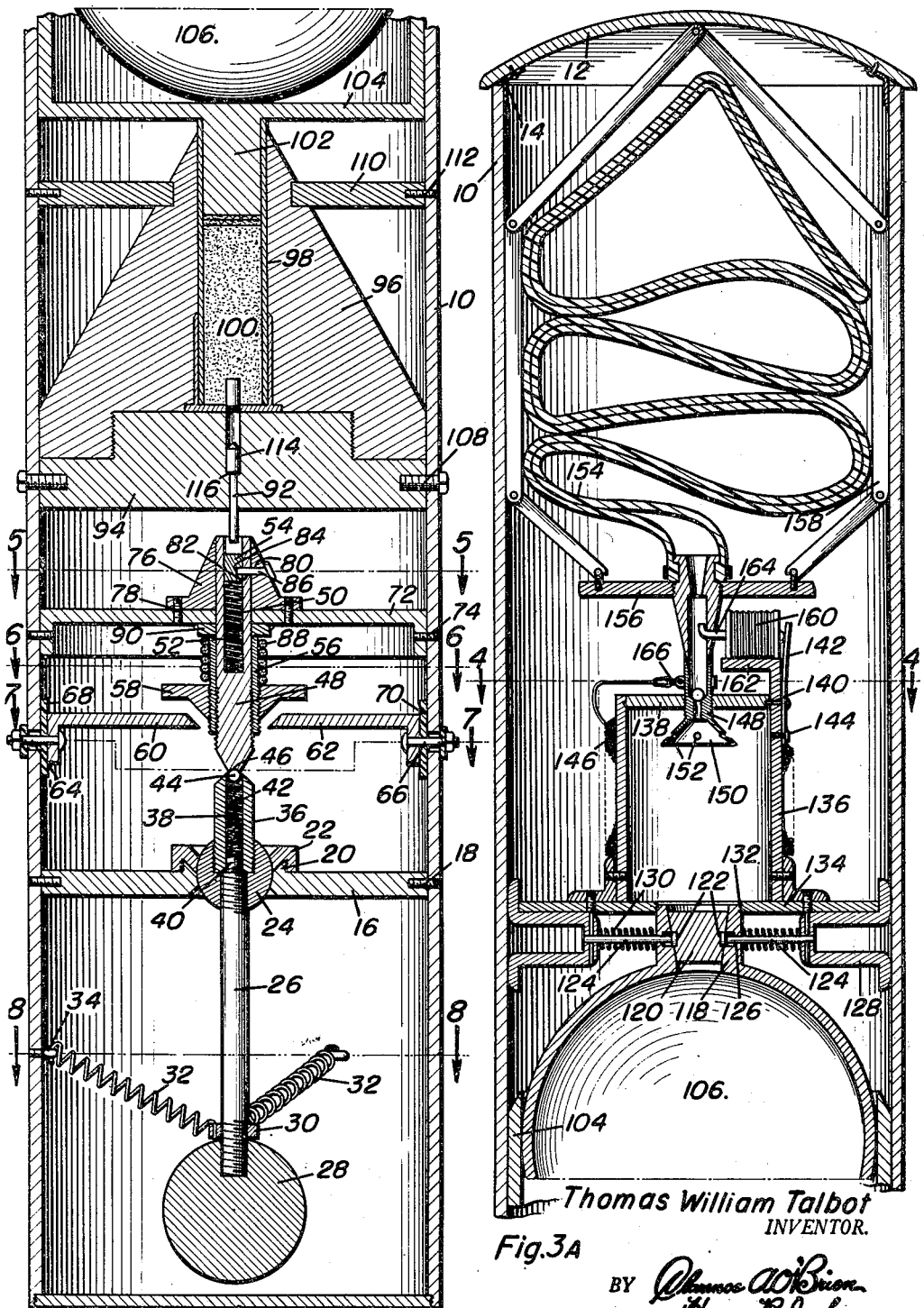
Figures 3 and 3a are enlarged vertical sectional views of the apparatus illustrating in greatest detail the relative arrangement of parts and showing the device in a non-activated state.
Figure 4:
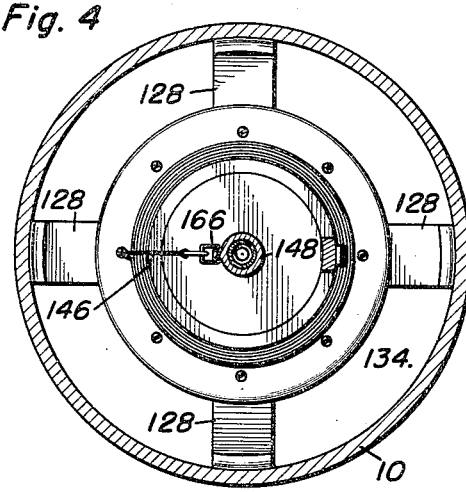
Figure 4 is a sectional detail view as taken along the plane of line 44 in Figure 3a illustrating the cover plate of the reel.
Figure 7:
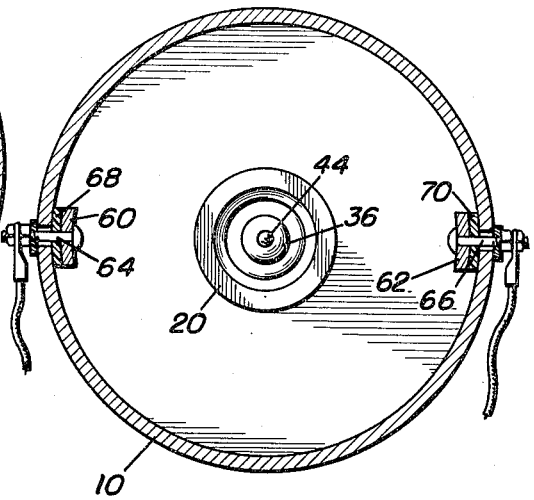
Figure 7 is a horizontal sectional veiw as taken along the plane of line 7—7 in Figure 3 illustrating the construction of the detent for supporting the firing pin holder.
Figure 5:
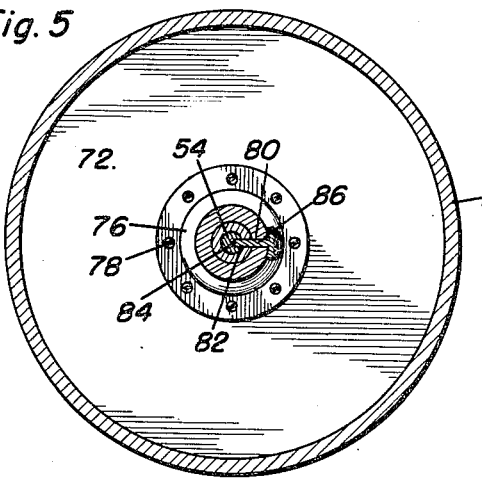
Figure 5 is a sectional detail view as taken along the plane of line 5—5 in Figure 3 illustrating the construction of the pull pin utilized in this invention.
Figure 8:
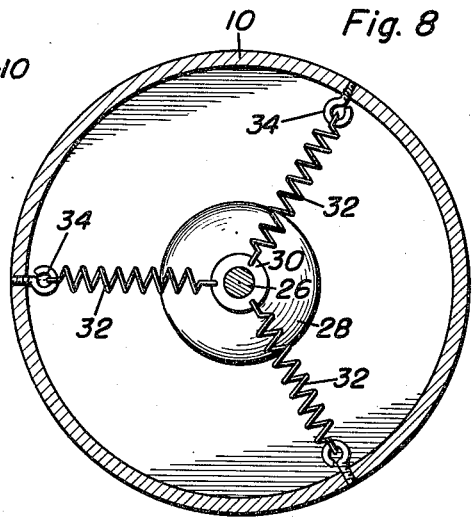
Figure 8 is a horizontal sectional view as taken along the plane of line 8—8 in Figure 3 illustratnig the resilient means for supporting the pendulum.
Figure 6:
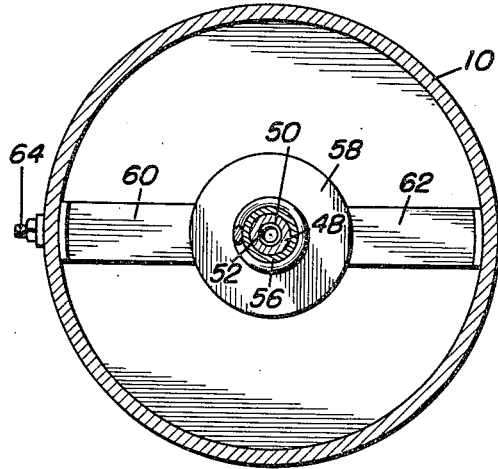
Figure 6 is a horizontal sectional view as taken along the plane of line 6—6 in Figure 3 illustrating the construction of the contact means for cutting the operational circuit between the battery and the master switch.

A comparatively strong coil spring 88 is positioned about the sleeve 56 and resiliently engages and extends between the collar 58 and a member 90 welded or otherwise secured to the plate 72. Thus, the firing hammer holder 48 is continuously urged downwardly and is in engagement with the detent 44 only when the pendulum is in an upright position. However, when the pendulum is actuated and moves from the upright position, the firing hammer holder will extend downwardly, as can be best seen in Figure 9. The headed pin 86 will then be pulled out by the action of the spring 88, thus allowing the spring 52 to cause the plug 54 to strike the lower end of a firing pin 92 extending upwardly through an aperture in a base member 94 of a casing 96 of conical shape. The casing 96 is provided with a central aperture 98 therein for reception of a cartridge 100 of suitable explosive material and for the reception of a projection 102 of a gas container support 104, thus permitting the gas container 106 to be carried by the casing 96.

It is to be noted that the base 94 is held in position by fasteners 108 and further means, including the members 110 attached by screws 112, are used for holding the casing 96 in position. When the hammer 54 strikes the firing pin 92 which is held in a lowered position by gravity, with the enlarged head 114 of the firing pin limited in movement by the shoulder 116 formed in the base 94, the firing pin 114 will detonate the cartridge 100, thus projecting the gas container support 104 and the gas container 106 outwardly of the housing 10.

The gas container 106 has an outlet conduit 118 affixed thereto which is adapted to be sealed by a plug 120. The plug 120 has recesses as at 122 therein for reception of plungers 124 which extend inwardly through apertures 126 formed in the conduit 118. Rigidly attached to the plungers 124 are shoes 128 adapted to engage the inner cylindrical side walls of the housing. Hence, as soon as the container 106 has been fired from the housing 10, the springs 130 coaxial with the plungers 124 and resiliently engaging and extending between the outlet conduit 118 and the shoes 128 will urge the shoes outwardly to remove the plungers 124 from the recesses 122, thereby permitting the gas in the container 106 which is under considerable pressure to blow the plug 120 upwardly and out from the conduit 118.

The conduit 118 is externally threaded at its upper end as at 132 for reception of a plate 134 to which there is connected a reel 136 provided with a sealing cover 138 which is detachably secured to the reel 136 by means of a release pin 140 resiliently held in position by leaf spring 142 attached, as by fastener 144 to the reel 136. A cable 146 is wrapped about the reel 136.

Extending downwardly through the cover 138 and threadedly secured thereto is a ball type check valve 148 which is provided with an enlarged funnel-shaped mouth 150 apertured in its side walls as at 152 so that the plug 120 cannot stop up flow of gas from the gas container 106 through the hollow reel 136 and thence through the valve 148 into an inflatable balloon 154. The inflatable balloon is attached to the upper end of the valve member 148. A plate 156 is threadedly secured to the upper portion of the valve member. A link framework 158 is attached to the plate 156 for maintaining the balloon 154 in a compact mass during the period when it is being expelled from the housing 10.

A bellows 160 is mounted on an extension 162 of the reel 136 and is connected by means of a suitable conduit 164 removably inserted into the valve member 148 so that upon subjection of the bellows 160 to the pressure in the balloon 154 after inflation thereof, the bellows 160 will expand, causing the release pin 140 to become disengaged from the cover 138 thereby enabling the balloon 154 to rise while the reel 136 and the gas container 106 which is secured thereto will form an anchor for the balloon. It is to be noted that the cable 146 which is anchored at one end to the reel 136 is connected by means of a swivel connection 166 to the valve element 148 which is carried upwardly with the balloon 154.

The balloon 154 is aluminum coated for providing reflection of radar waves. It may be colored with a suitable bright pigment for greater daylight vision, yet may be provided with a phosphorescent band or entirely coated with a phosphorescent so as to promote night visibility.

It is to be noted that as soon as the airplane in which this device has been stalled has crashed, the pendulum will be activated, causing the firing pin to discharge the cartridge and blow the gas container 106 as well as the balloon 154 outwardly lifting the cap 12 off the housing 10. Then the balloon 154 will become inflated and rise to a height limited by the length of the cable 146. The gas container and associated mechanisms such as the reel 136 will form an anchor for the balloon.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An inertia actuated indicator for crashed airplanes comprising a housing, a pendulum mounted in said housing, a casing having a combustion chamber in said housing, an explosive cartridge in said chamber, a firing pin for firing said explosive charge, said firing pin being adapted to be struck by a firing hammer, a firing hammer holder having a recess therein, said slide being received in said recess, a plate attaching said firing hammer holder to said housing, a headed pin attaching said hammer to said holder and said holder to said plate, a spring for urging said hammer outwardly of said holder, a collar on said holder, a detent carried by said pendulum, and resilient means urging said holder normally into engagement with said detent, said resilient means extending between said plate and said collar so that when said pendulum is subjected to a predetermined acceleration to disengage said detent from said holder, said resilient means will urge said holder to move with respect to said plate to urge said headed pin outwardly while said spring will urge said hammer to move with respect to said holder to strike said firing pin, a gas container carried by said casing, a deflated balloon in said housing, an outlet conduit connecting the balloon with said gas container sealed by a plug, resilient means locking said plug in said chamber when said resilient means are in said housing, valve means for controlling flow of gas between said container and said balloon, a hollow reel interconnecting said valve means with said outlet conduit, a cable secured at one end to said balloon and secured at the other end thereof to said reel, and means associated with said valve means for disconnecting said valve means from said reel, said means for disconnecting said valve means from said reel including a cover plate for the reel, a release pin detachably securing said cover plate to said reel, a holding spring holding said release pin in position to secure said cover plate to said reel, a bellows mounted on said reel in communication with said valve and said balloon and engaging said holding spring so that upon inflation of said balloon said bellows will actuate said holding spring to disengage said release pin from said cover plate to disengage said cover plate from said reel.

2. An inertia actuated indicator for crashed airplanes comprising a housing, a pendulum mounted in said housing, a casing having a combustoin chamber in said housing, an explosive cartridge in said chamber, a firing pin for firing said explosive charge, said firing pin being adapted to be struck by a firing hammer, a firing hammer holder having a recess therein, said slide being received in said recess, a plate attaching said firing hammer holder to said housing, a headed pin attaching said hammer to said holder and said holder to said plate, a spring for urging said hammer outwardly of said holder, a collar on said holder, a detent carried by said pendulum, and resilient means urging said holder normally into engagement with said detent, said resilient means extending between said plate and said collar so that when said pendulum is subjected to a predetermined acceleration to disengage said detent from said holder, said resilient means will urge said holder to move with respect to said plate to urge said headed pin outwardly while said spring will urge said hammer to move with respect to said holder to strike said firing pin, a gas container carried by said casing, a deflated balloon in said housing, an outlet conduit connecting the balloon with said gas container sealed by a plug, resilient means locking said plug in said chamber when said resilient means are in said housing, said outlet conduit having apertures therethrough, said plug having recesses therein, plungers extending through said apertures and seated in said recesses, shoes engageable with the housing and attached to said plungers, and spring resiliently engaging and extending between said outlet conduit and said shoes, valve means for controlling flow of gas between said container and said balloon, a hollow reel interconnecting said valve means with said outlet conduit, a cable secured at one end to said balloon and secured at the other end thereof to said reel, and means associated with said valve means for disconnecting said valve means from said reel, said means for disconnecting said valve means from said reel including a cover plate on the reel, a release pin detachably securing said cover plate to said reel, a holding spring holding said release pin in position to secure said cover plate to said reel, a bellows mounted on said reel in communication with said valve and said balloon and engaging said holding spring so that upon inflation of said ballon said bellows will actuate said holding spring to disengage said release pin from said cover plate to disengage said cover plate from said reel.

References Cited in the file of this patent
UNITED STATES PATENTS

| | | |
|---|---|---|
| 1,836,495 | Paulson | Dec. 15, 1931 |
| 2,013,924 | Nolte | Sept. 10, 1935 |
| 2,176,770 | Maught | Oct. 17, 1939 |
| 2,192,450 | Miller | Mar. 5, 1940 |
| 2,236,872 | Grigsby | Apr. 1, 1941 |
| 2,380,587 | Fenton | July 31, 1945 |
| 2,396,960 | Marple | Mar. 19, 1946 |